United States Patent
Maxfield et al.

(10) Patent No.: US 12,258,090 B2
(45) Date of Patent: Mar. 25, 2025

(54) CHAIN SEPARATOR FOR MANUAL BIKE TRAINING

(71) Applicant: TILT INDUSTRIES LLC, Mapleton, UT (US)

(72) Inventors: Bradley Scott Maxfield, Orem, UT (US); Mitchel Richard Murdock, Orem, UT (US); Travis James Mittanck, Orem, UT (US); Grant Reuben Fawson, Orem, UT (US)

(73) Assignee: TILT INDUSTRIES LLC, Mapleton, UT (US)

( * ) Notice: Subject to any disclaimer, the term of this patent is extended or adjusted under 35 U.S.C. 154(b) by 0 days.

(21) Appl. No.: 17/945,955

(22) Filed: Sep. 15, 2022

(65) Prior Publication Data
US 2023/0079035 A1    Mar. 16, 2023

Related U.S. Application Data

(60) Provisional application No. 63/244,639, filed on Sep. 15, 2021.

(51) Int. Cl.
*B62J 50/00*    (2020.01)

(52) U.S. Cl.
CPC .................... *B62J 50/00* (2020.02)

(58) Field of Classification Search
CPC .......................................... B62J 50/00
USPC ........................................ 474/273
See application file for complete search history.

(56) References Cited

U.S. PATENT DOCUMENTS

| | | | | |
|---|---|---|---|---|
| 4,135,727 A | * | 1/1979 | Campagnolo | B62M 25/04 280/236 |
| 4,167,125 A | * | 9/1979 | Hedrich | B62M 9/125 474/82 |
| 4,681,557 A | * | 7/1987 | Hillman | F16H 7/24 474/119 |
| 6,003,236 A | | 12/1999 | Hoeft | |
| 7,066,856 B1 | * | 6/2006 | Rogers | B62J 23/00 474/144 |
| 8,979,685 B2 | * | 3/2015 | Weagle | B62J 13/00 474/144 |
| 2020/0079472 A1 | | 3/2020 | Tages | |

FOREIGN PATENT DOCUMENTS

DE    0807569 A2 *    5/1997

OTHER PUBLICATIONS

Intellectual Property Office, "Search report," issued in connection with UK Patent Application No. GB2213575.0, dated Feb. 15, 2023 (1 page).
Intellectual Property Office, "Examination report," issued in connection with UK Patent Application No. GB2213575.0, dated Nov. 19, 2024 (3 pages).

* cited by examiner

*Primary Examiner* — Michael R Mansen
*Assistant Examiner* — Mark K Buse
(74) *Attorney, Agent, or Firm* — HOLLAND & HART LLP (57) ABSTRACT

A chain separator for separating a chain of a bicycle from a sprocket of the bicycle. The chain separator includes a body defining an outer surface and at least one projection extending from the body to define a sprocket channel. The chain is disengaged from the sprocket and positioned on the outer surface and the chain separator is positioned on the bicycle such that the sprocket is positioned within the sprocket channel.

18 Claims, 12 Drawing Sheets

CHAIN SEPARATOR FOR MANUAL BIKE TRAINING

CROSS REFERENCE TO RELATED APPLICATIONS

This application claims the benefit of and priority to U.S. Provisional Patent Application No. 63/244,639, filed Sep. 15, 2021, which is hereby incorporated by reference in its entirety.

BACKGROUND

Mountain biking and other forms of cycling often include maneuvering around or over obstacles and uneven terrain. Many cyclists find it helpful to lift the front (and occasionally the rear) wheel of their bicycle over the obstacles on their trail. Doing this also looks cool and shows off the rider's ability and skill. Such a maneuver requires a very specific ability to balance on a single wheel of the bicycle while riding. Failure to keep balance may result in hitting the obstacle or crashing, potentially causing injury to the cyclist or damage to the bicycle. Some cyclists attempt to improve their ability to balance through the use of a training apparatus that maintains the bicycle in position while the cyclist practices balancing the bicycle. However, the cyclist may not properly train because the pedals and the chain enable the cyclist to use the pedals to maintain the bicycle in a balanced configuration without actually balancing the bicycle. Some cyclists may disengage the chain by removing it from the front sprocket, or even by removing the chain completely from the bicycle in order to achieve an authentic balancing training experience. However, the hanging chain may interfere with a balancing exercise or damage the bicycle.

Opportunities exist for improvements in the ways the chain may be disengaged to improve the balance training experience.

SUMMARY

The described techniques relate to improved methods, systems, devices, or apparatuses that provide, among other things, disengagement of a chain of a bicycle from a sprocket of the bicycle.

One aspect of the present disclosure relates to a chain separator for separating a chain of a bicycle from a sprocket of the bicycle. The chain separator includes a body defining an outer surface and at least one projection extending from the body to define a sprocket channel. The chain is disengaged from the sprocket and positioned on the outer surface and the chain separator is positioned on the bicycle such that the sprocket is positioned within the sprocket channel.

Another aspect of the present disclosure relates to a method of disabling a chain on a bicycle. The method includes disengaging the chain from a sprocket of the bicycle. The method also includes positioning a chain separator proximate the sprocket of the bicycle. The chain separator defines an outer surface. The method further includes positioning the chain on the outer surface.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
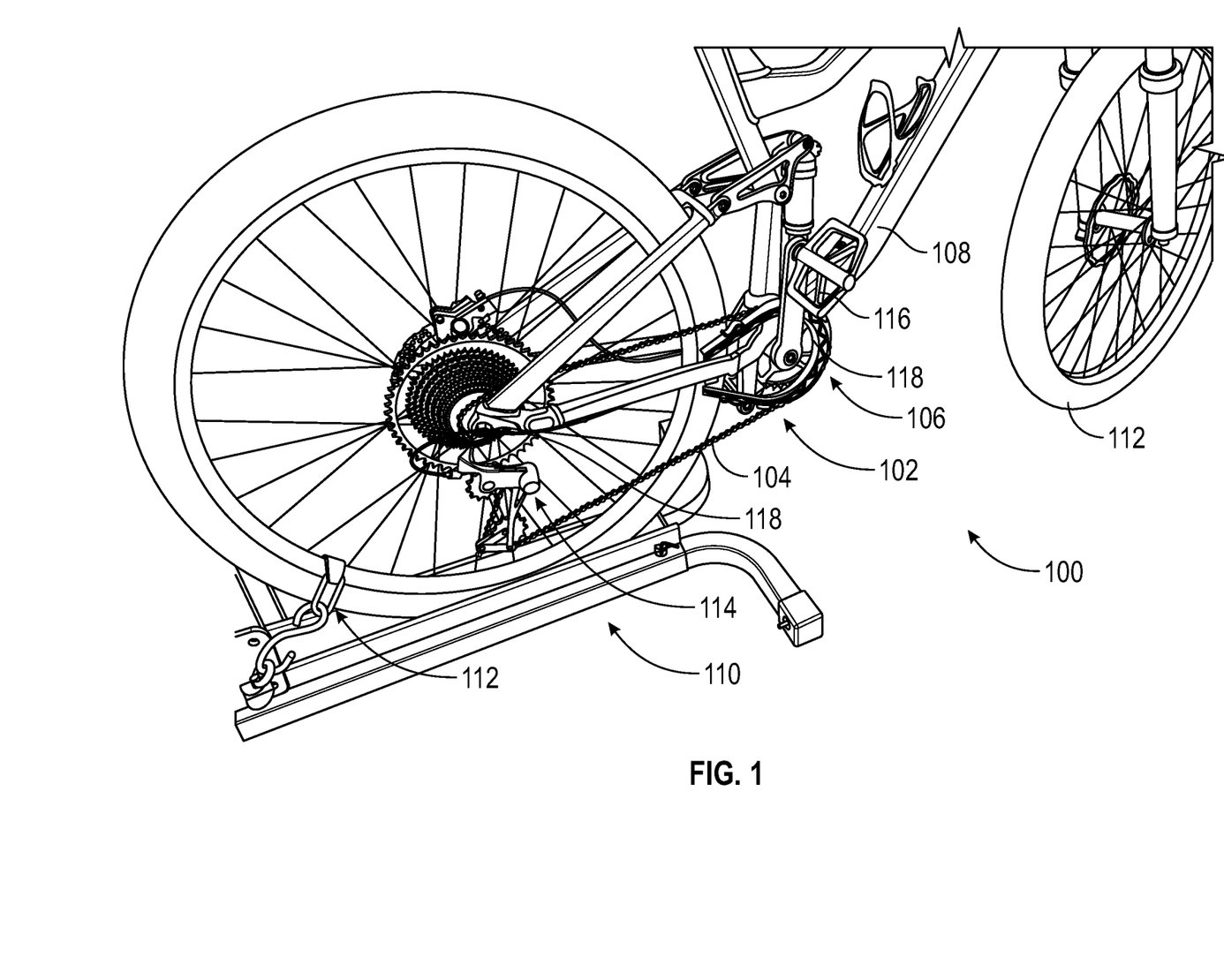
FIG. 1 illustrates a perspective view of one example of a bicycle including a chain separator in accordance with aspects of the present disclosure.

FIG. 1 illustrates a perspective view of one example of a bicycle 100 including a chain separator 102 mounted thereon for separating a chain 104 from a front sprocket assembly 106. Specifically, the chain separator 102 is mounted on a frame 108 of the bicycle 100 and on the front sprocket assembly 106 such that the chain 104 is disengaged from the front sprocket assembly 106 during a training exercise. More specifically, in the illustrated embodiment, the bicycle 100 is positioned in an apparatus 110 that is used to retain a bicycle tire 112 of the bicycle 100 in a stationary position while a user tries to balance on the bicycle 100 with the retained tire 112 secured in the apparatus 110 and the other tire 112 lifted off of the ground. In some instances, a rear tire 112 is secured in the apparatus 110, while in others, a front tire 112 may be secured in the apparatus 110. Thus, the apparatus 110 enables the user to practice tilting the bicycle 110 without traveling.

Without being disengaged from the front sprocket assembly, the chain 104 may interfere with the user during training. Specifically, if the chain 104 is engaged with the front sprocket assembly 106 during the training exercise, the user may apply forward pressure to the pedals and keep the bicycle 100 in a rear wheel balance position without practicing proper balance technique. As such, some users have disengaged the chain 104 from the front sprocket assembly 106 by hanging the chain 104 from a rear sprocket assembly 114 or from some other portion of the bicycle 100. However, a hanging chain 104 may interfere with the training exercise because the chain 104 is not secured to the bicycle 100 and may swing or get sucked up during the tilting exercise, causing binding and damage to the bicycle 100. The chain separator 102 described herein disengages the chain 104 from the front sprocket assembly 106 while still securing the chain 104 on the bicycle 100. Thus, the chain separators 102 described herein enable the user to practice tilting without the chain 104 hanging from the bicycle 100, interfering with the training exercise.

As shown in FIG. 1, the bicycle 100 includes a frame 108, two tires 112 (the front tire 112 and the rear tire 112) attached to the frame 108, the front sprocket assembly 106 attached to the frame 108, a rear sprocket assembly 114 attached to the frame 108, the chain 104 engaged with the front sprocket assembly 106 and the rear sprocket assembly 114, and two pedals 116 attached to opposite sides of the front sprocket assembly 106. In the illustrated embodiment, the rear tire 112 is positioned in the apparatus 110 to enable the user to practice tilting as described above. Additionally, in the illustrated embodiment, the front sprocket assembly 106 includes a single sprocket 118 and the rear sprocket assembly 114 includes a plurality of sprockets 118. In alternative embodiments, the front sprocket assembly 106 includes a plurality of sprockets 118 and the rear sprocket assembly 114 includes a single sprocket 118. In another alternative embodiment, the front sprocket assembly 106 includes a plurality of sprockets 118 and the rear sprocket assembly 114 includes a plurality of sprockets 118.

In the illustrated embodiment, the chain separator 102 is positioned on the sprocket 118 of the front sprocket assembly 106 to separate the chain 104 from the sprocket 118 of the front sprocket assembly 106. In alternative embodiments (illustrated in FIG. 10), the chain separator 102 is positioned on a sprocket 118 of the rear sprocket assembly 114 to separate the chain 104 from the sprocket 118 of the rear sprocket assembly 114. Specifically, in the illustrated embodiment, the chain separator 102 at lease partially circumscribes the sprocket 118 of the front sprocket assembly 106 and rest on a portion of the frame 108. The chain 104 is positioned on the chain separator 102 such that the chain 104 does not engage with the sprocket 118 of the front sprocket assembly 106.

Figure 2:
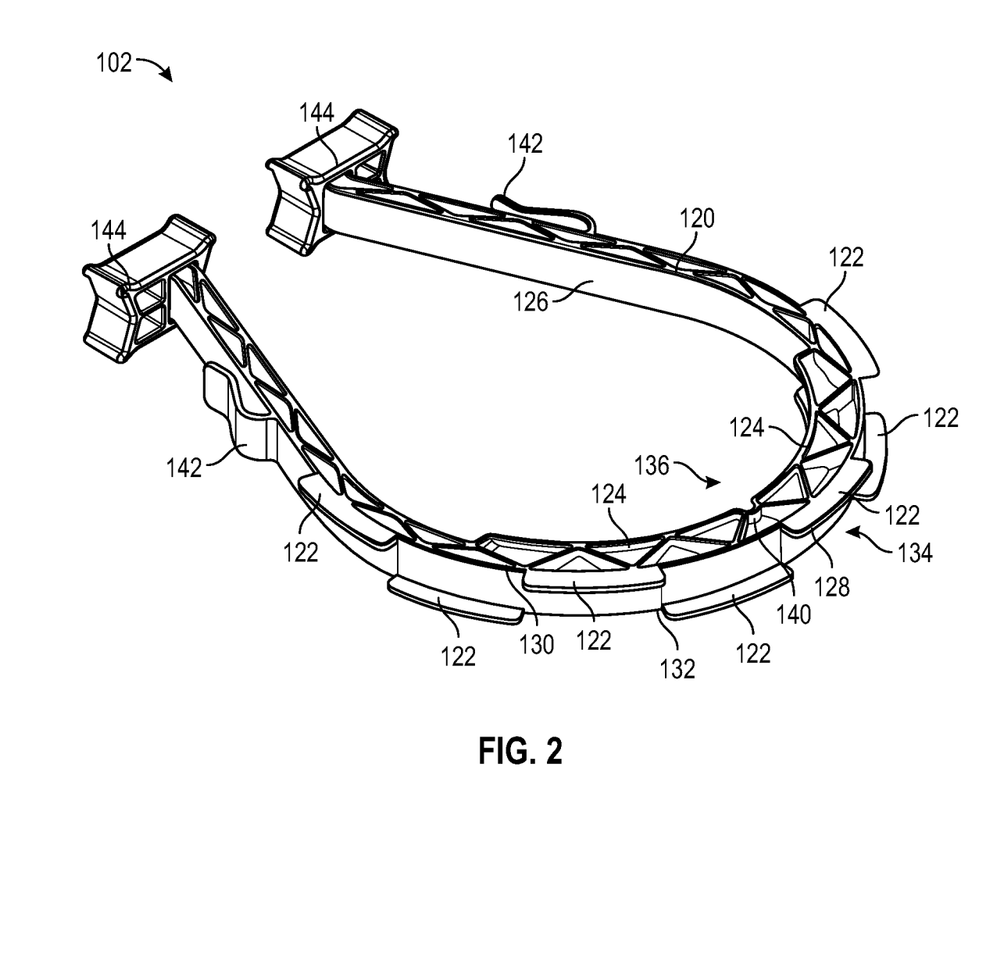
FIG. 2 illustrates a perspective view of the chain separator illustrated in FIG. 1 in accordance with aspects of the present disclosure.
Figure 3:
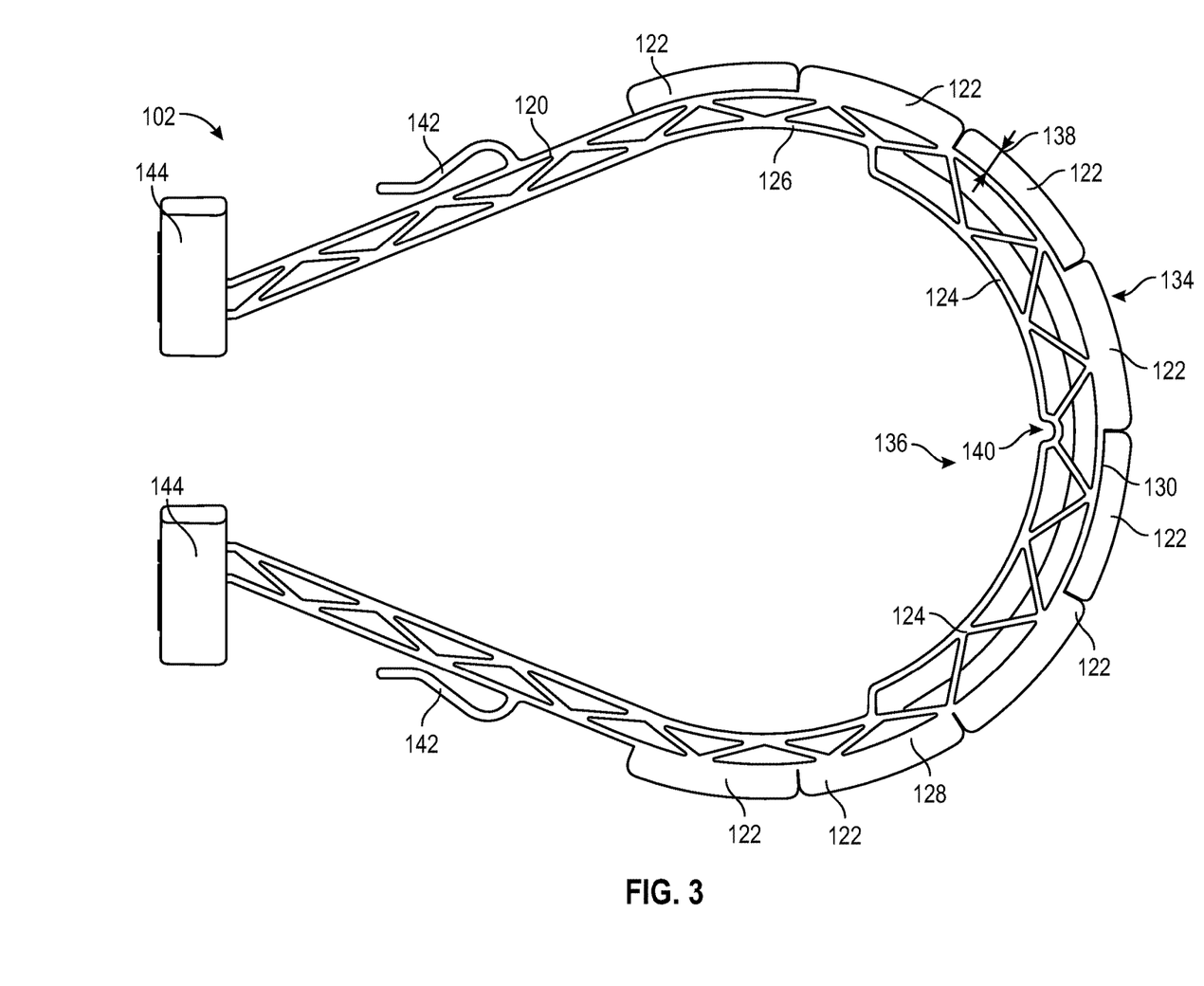
FIG. 3 illustrates a side view of the chain separator illustrated in FIG. 1 in accordance with aspects of the present disclosure.
Figure 4:
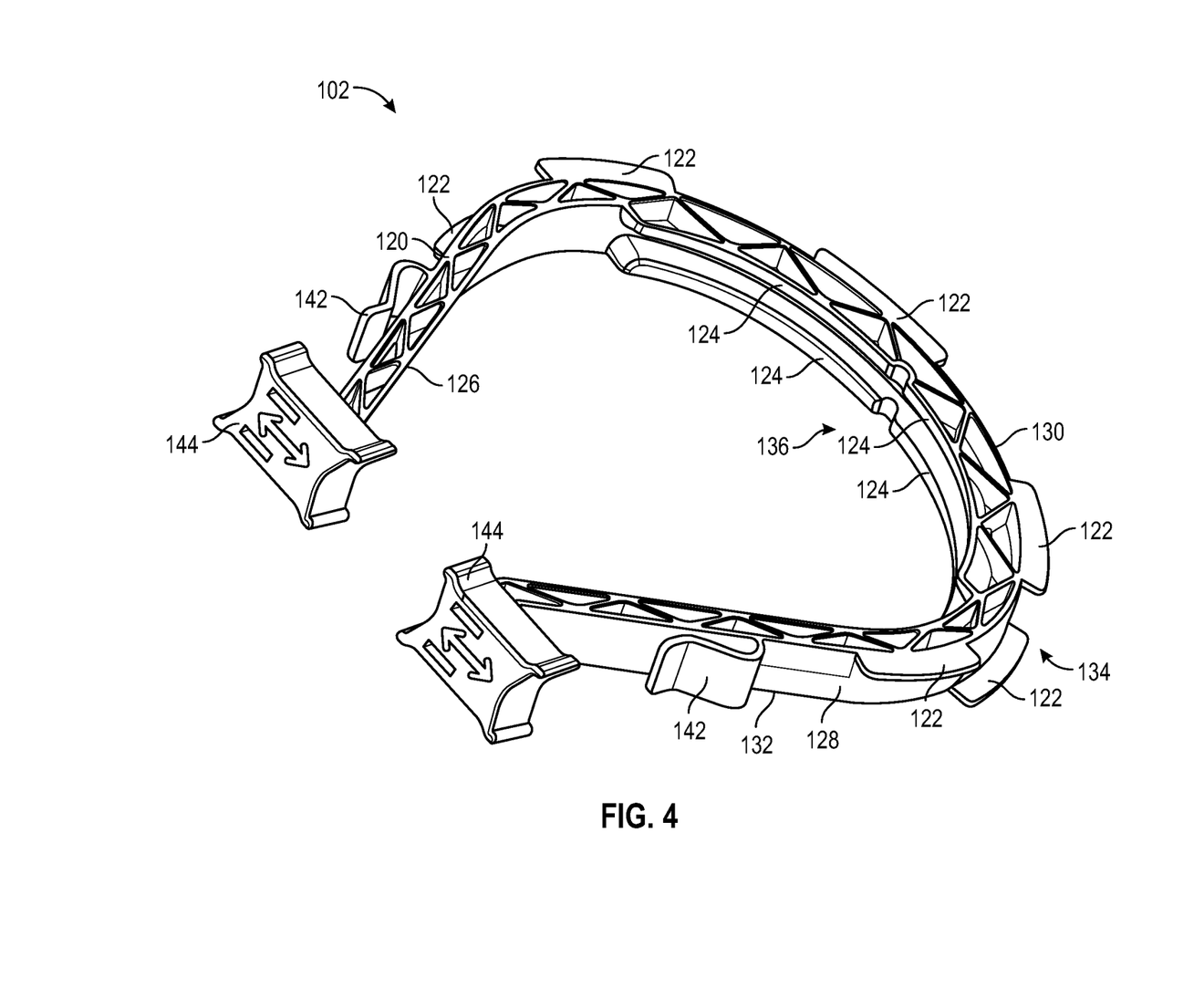
FIG. 4 illustrates another perspective view of the chain separator illustrated in FIG. 1 in accordance with aspects of the present disclosure.
Figure 5:
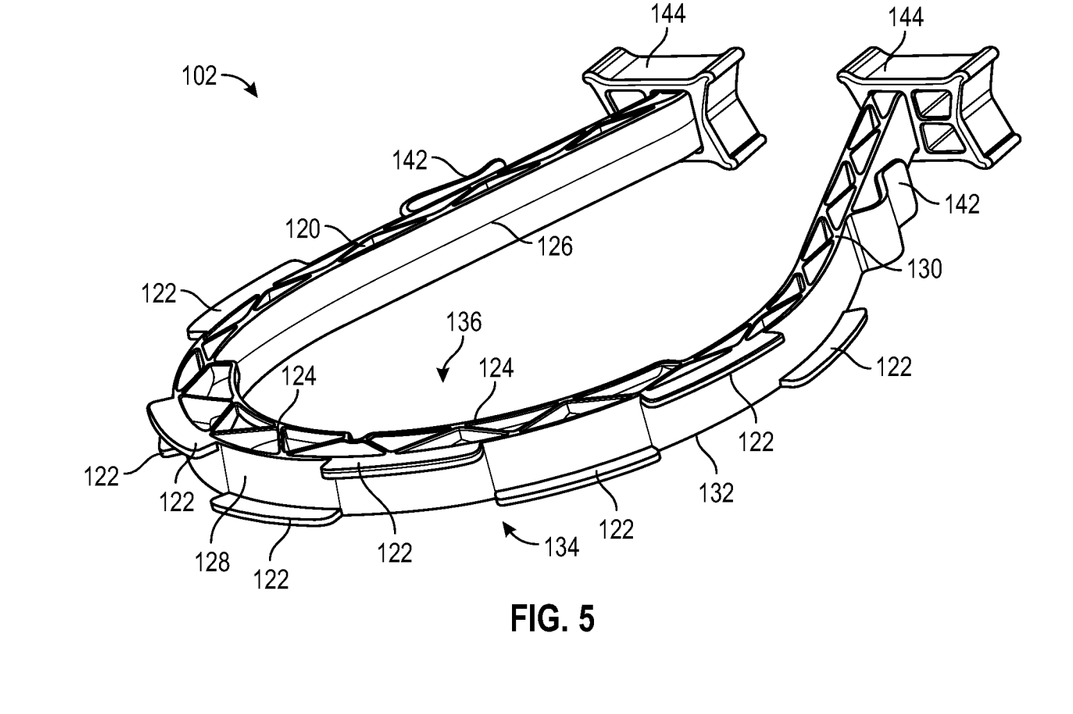
FIG. 5 illustrates another perspective view of the chain separator illustrated in FIG. 1 in accordance with aspects of the present disclosure.

FIG. 2 is a perspective view of the chain separator 102. FIG. 3 is a side view of the chain separator 102. FIG. 4 is another perspective view of the chain separator 102. FIG. 5 is another perspective view of the chain separator 102. As shown in FIGS. 2-5, the chain separator 102 includes a body 120 having a horseshoe shape, at least one tab 122 extending from the body 120, and at least one projection 124 extending from the body 120. Specifically, the body 120 has an inner surface 126 and an outer surface 128. The at least one tab 122 extends from the outer surface 128 and the at least one projection 124 extends from the inner surface 126. The at least one tab 122 retains the chain 104 on the body 120 and the at least one projection 124 maintains the body 120 on the sprocket 118 of the front sprocket assembly 106.

Specifically, the body 120 has a first edge 130 and a second edge 132. Additionally, in the illustrated embodiment, the chain separator 102 includes a plurality of tabs 122 extending from the outer surface 128 and a plurality of projections 124 extending from the inner surface 126. The plurality of tabs 122 are positioned proximate the first edge 130 and the second edge 132 on the outer surface 128 such that the outer surface 128 and the plurality of tabs 122 define a chain channel 134 that retains the chain 104 on the body 120 such that the chain 104 is disengaged from the sprocket 118 of the front sprocket assembly 106. That is, the chain 104 is positioned on the outer surface 128 of the chain channel 134 such that the outer surface 128 separates the chain 104 from the front sprocket assembly 106. Additionally, the plurality of projections 124 are positioned proximate the first edge 130 and the second edge 132 on the inner surface 126 such that the inner surface 126 and the plurality of projections 124 define a sprocket channel 136 that maintains the body 120 on the sprocket 118 of the front sprocket assembly 106 such that the chain 104 is disengaged from the sprocket 118 of the front sprocket assembly 106.

More specifically, the plurality of tabs 122 includes a plurality of rectangular tabs 122 that are curved to correspond to the curved, horseshoe shape of the body 120. In the illustrated embodiment, the chain separator 102 includes eight rectangular tabs 122 arranged in an alternating pattern such that four of the rectangular tabs 122 are positioned proximate the first edge 130 and four of the rectangular tabs 122 are positioned proximate the second edge 132. Additionally, the tabs 122 have a tab height 138 that is greater than a width and/or height of the chain 104 to retain the chain 104 within the chain channel 134. Thus, the alternating pattern of rectangular tabs 122, the tab height 138, and the shape of the tabs 122 define the chain channel 134 such that the chain 104 is retained on the body 120.

In an alternative embodiment, the chain separator 102 may not include any tabs 122. Rather, the chain 104 may merely be positioned on the outer surface 128 without tabs 122 to maintain the chain 104 on the outer surface 128. In another alternative embodiment, the chain separator may include two continuous tabs 122 positioned on either side of the chain channel 134. In yet another alternative embodiment, the tabs 122 may have any shape that enables the chain separator 102 to operate as described herein.

Additionally, the plurality of projections 124 includes a plurality of tapered projections 124 that are curved to correspond to the curved, horseshoe shape of the body 120. In the illustrated embodiment, the chain separator 102 includes four tapered projections 124 arranged such that two of the tapered projections 124 are positioned proximate the first edge 130 and two of the tapered projections 124 are positioned proximate the second edge 132 to define the sprocket channel 136. Additionally, the projections 124 taper inwards such that the sprocket 118 of the front sprocket assembly 106 is directed into a middle of the sprocket channel 136 and maintained within the sprocket channel 136. Accordingly, the shape and arrangement of the projections 124 maintain the sprocket 118 of the front sprocket assembly 106 within the sprocket channel 136 during the training exercise.

The plurality of projections 124 also defines a notch 140 that enables the chain separator 102 to be hung on a hanger or nail (not shown). Specifically, as shown in FIG. 3, two of the projections 124 are separated from the other two projections 124 and the space between the two sets of projections 124 is curved to define the notch 140.

The chain separator 102 also includes at least one clip 142 that enables the chain separator 102 to be hung for storage. In the illustrated embodiment, the chain separator 102 includes two clips 142 that are attached to the outer surface 128 of the body 120 to enable the chain separator 102 to be hung for storage. The clips 142 are integrally formed with the body 120 during manufacturing, such as by molding or by an additive manufacturing process and may have a curved shape to clip onto equipment.

The chain separator 102 further includes at least one stabilizer 144 attached to the body 120 to stabilize the chain separator 102 on the frame 108. In the illustrated embodiment, the chain separator 102 includes two stabilizers 144 attached to the body 120 to stabilize the chain separator 102 on the frame 108. Specifically, the body 120 is formed of a polymer that biases the stabilizers 144 toward each other such that the stabilizers 144 form a friction fit on the frame 108, maintaining the chain separator 102 on the frame 108. More specifically, the body 120 may be formed of a hard nylon plastic biases the stabilizers 144 toward each other such that the stabilizers 144 form the friction fit on the frame 108, maintaining the chain separator 102 on the frame 108. Additionally, the stabilizers 144 may be formed of a rubber or some other conformable/elastic material that at least partially conforms to the shape of the frame 108, increasing friction between the stabilizers 144 and the frame 108 and increasing the stability of the friction fit between the frame 108 and the stabilizers 144. Additionally, the rubber or other conformable/elastic material prevents damage to the bicycle 100.

Figure 6:
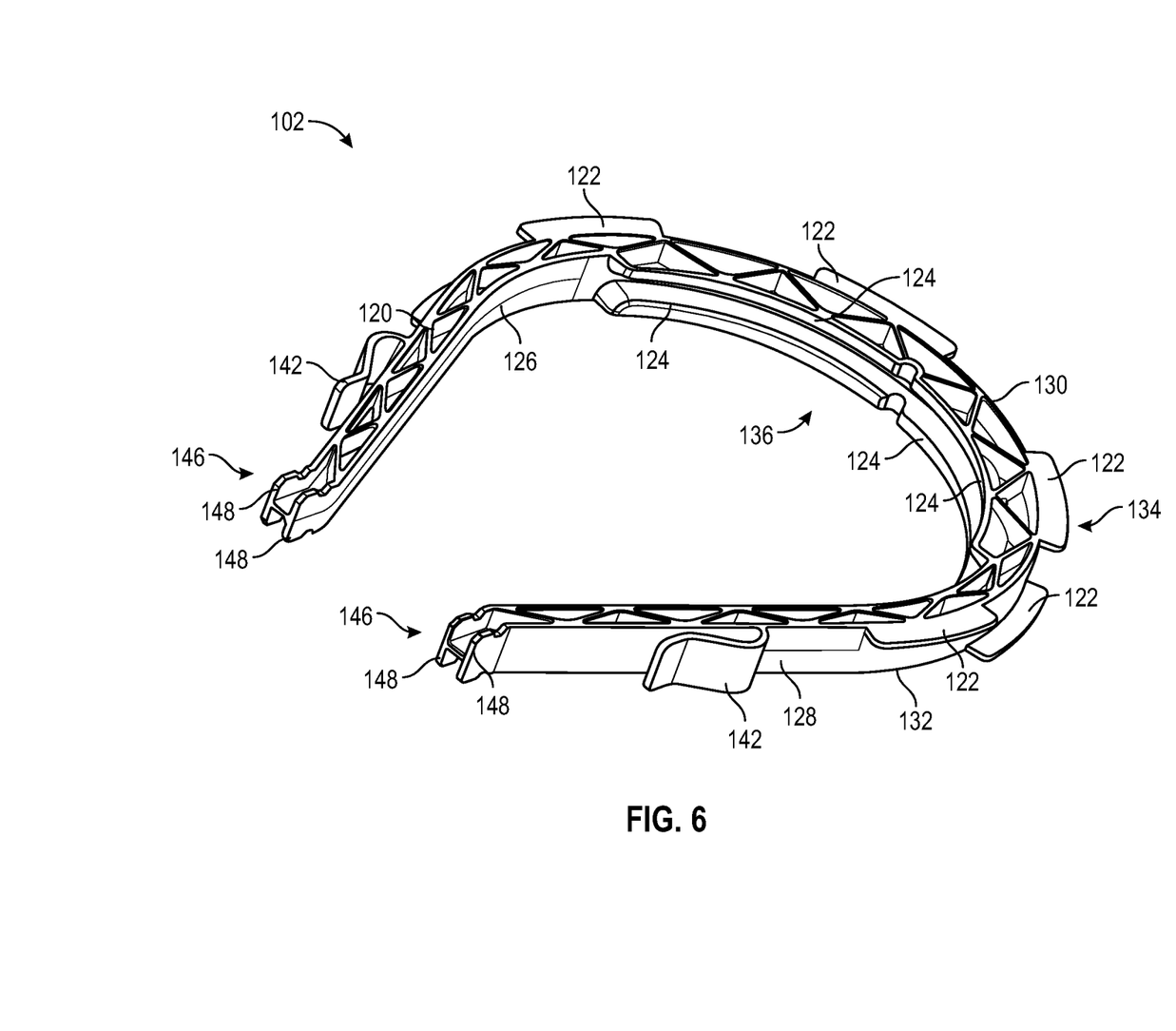
FIG. 6 is a perspective view of the chain separator illustrated in FIG. 1 with the stabilizers removed from the body of the chain separator in accordance with aspects of the present disclosure.
Figure 7:
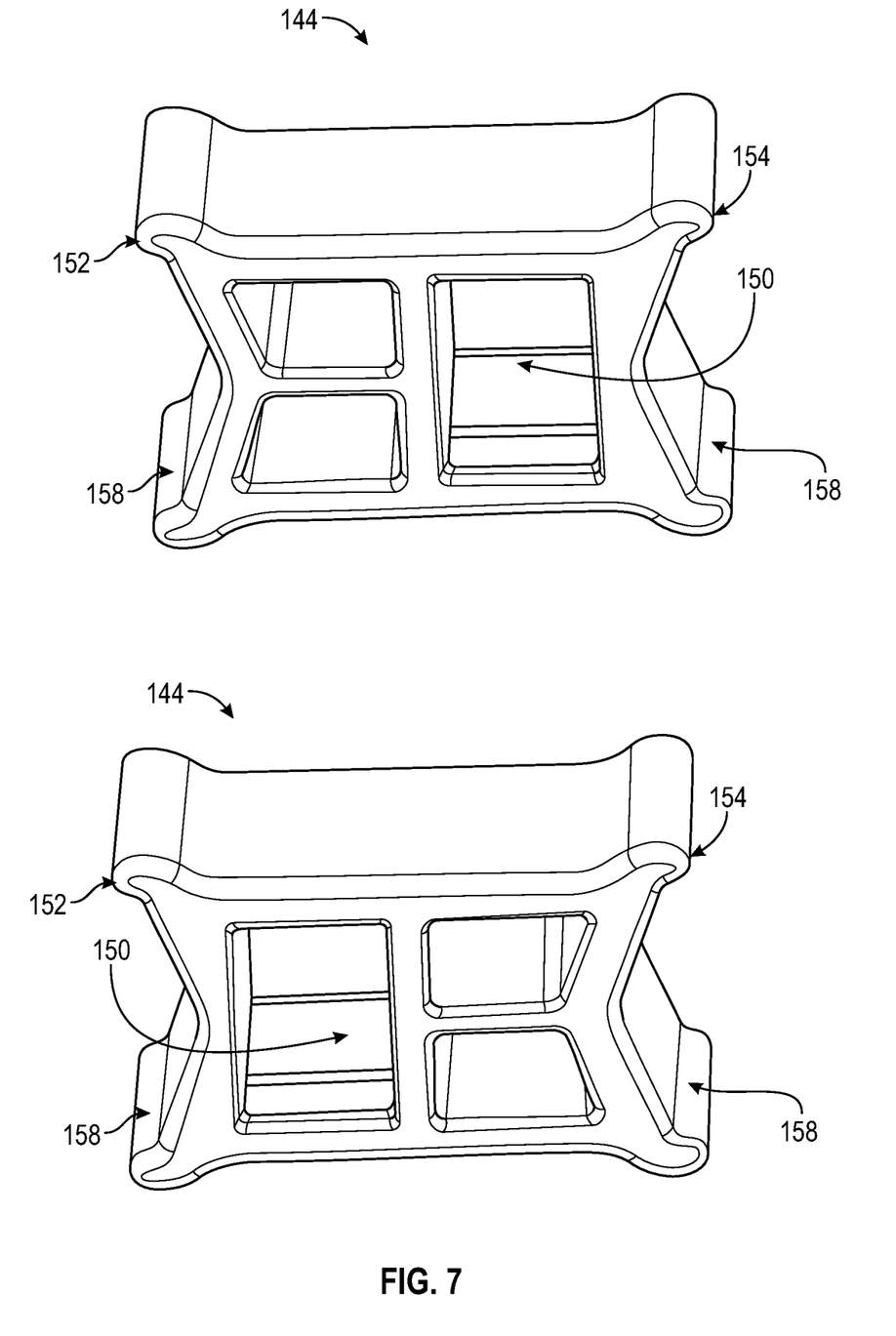
FIG. 7 is a perspective view of the stabilizers illustrated in FIGS. 1-5 removed from the body in accordance with aspects of the present disclosure.
Figure 8:
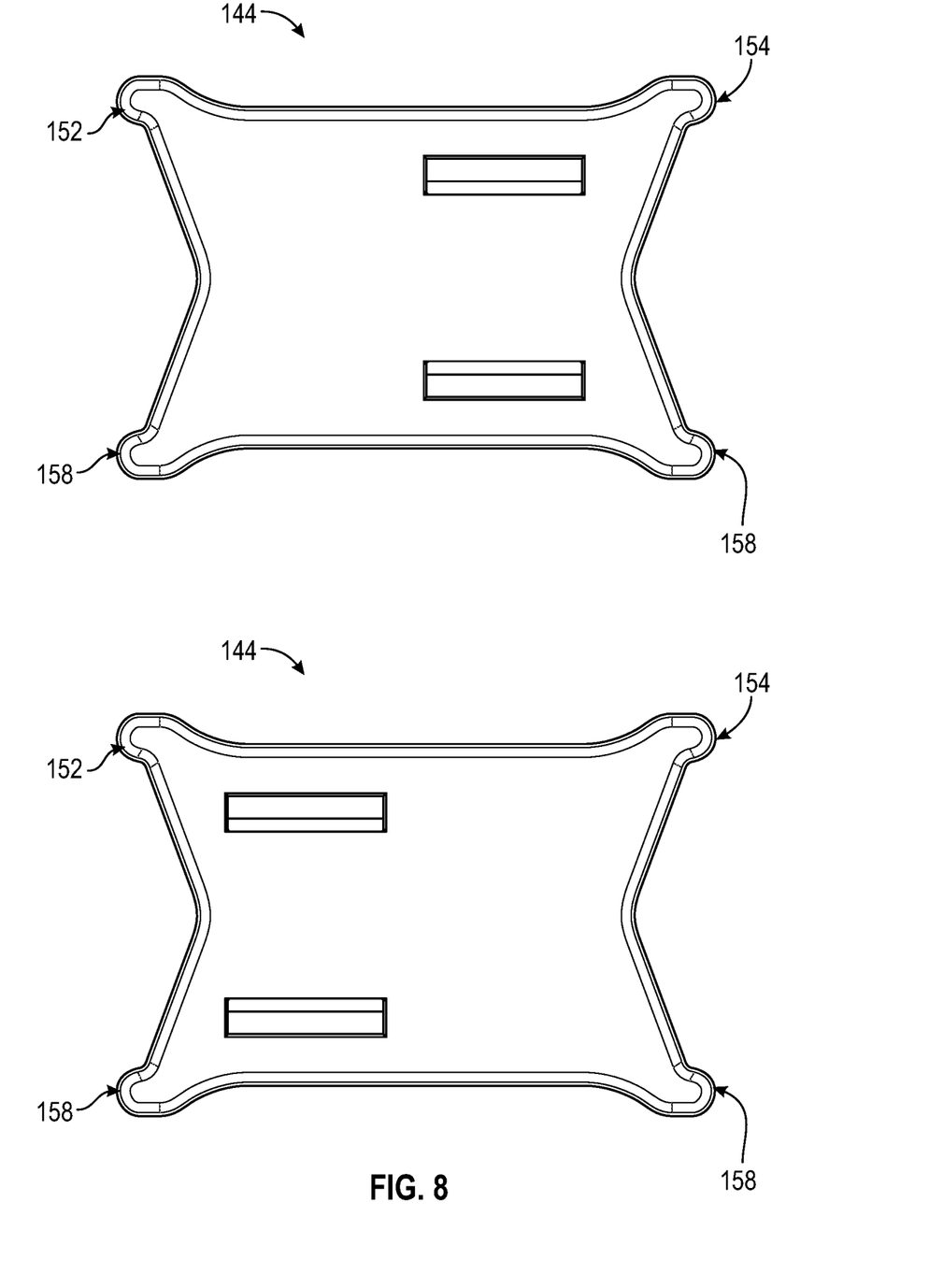
FIG. 8 is a top view of the stabilizers illustrated in FIGS. 1-5 removed from the body in accordance with aspects of the present disclosure.
Figure 9:
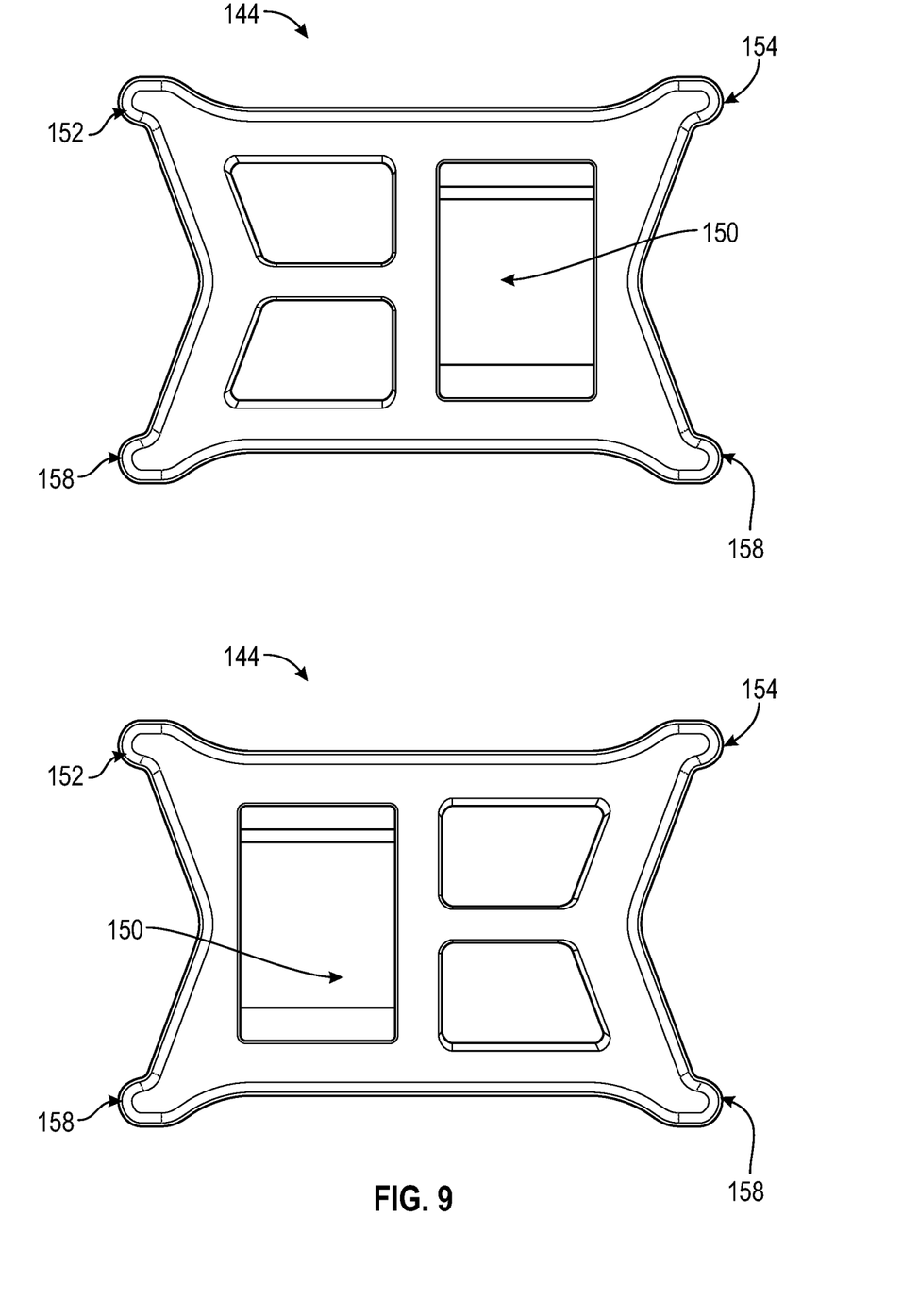
FIG. 9 is a bottom view of the stabilizers illustrated in FIGS. 1-5 removed from the body in accordance with aspects of the present disclosure.

FIG. 6 is a perspective view of the chain separator 102 with the stabilizers 144 removed body 120. FIG. 7 is a perspective view of the stabilizers 144 removed from the body 120. FIG. 8 is a top view of the stabilizers 144 removed from the body 120. FIG. 9 is a bottom view of the stabilizers 144 removed from the body 120. As shown in FIG. 6, the body 120 includes at least one connector 146 that attaches the stabilizer 144 to the body 120. In the illustrated embodiment, the body 120 includes two connectors 146 that attach the stabilizers 144 to the body 120. The connectors 146 include extensions 148 that retain the stabilizers 144 on the body 120.

Additionally, as shown in FIGS. 7-9, the stabilizers 144 each define at least one retention hole 150 that is configured to receive one of the connectors 146 to retain the stabilizers 144 on the body 120. Specifically, the extensions 148 are shaped such that the extensions 148 snap the connectors 146 into the retention holes 150 when the connectors 146 are inserted into the retention holes 150. Additionally, the extensions 148 are also shaped such that the extensions 148 unsnap the connectors 146 from the retention holes 150 when the connectors 146 are removed from the retention holes 150. Thus, the connectors 146 and the stabilizers 144 are sized and shaped to removably attach the stabilizers 144 to the body 120.

Additionally, the stabilizers 144 are adjustably attached to the connectors 146 to enable the stabilizers 144 to adjust to and attach to different size frames 108. Specifically, in the illustrated embodiment, the stabilizers 144 each have a first end 152 and a second end 154. Both the first and second ends 152 and 154 are shaped to form a friction fit on the frame 108, maintaining the chain separator 102 on the frame 108. More specially, the first and second ends 152 and 154 define a frame notch 156 that at least partially receives a portion of the frame 108 therein to form the friction fit on the frame 108. The frame notches 156 partially conform to the shape of the frame 108 to enable the stabilizers to form the friction fit.

The stabilizers 144 may be adjusted by rotating the stabilizers 144 on the connectors 146. Specifically, the retention holes 150 are located eccentrically within the stabilizers 144 such that the stabilizers extend a first length toward each other in a first configuration and a second length toward each other in a second configuration. The second length may be greater than the first length. As shown in FIGS. 2-5 illustrating the stabilizers 144 in the first configuration, the stabilizers 144 are configured to from the friction fit on a larger frame 108. If the frame 108 is smaller, the stabilizers 144 may be rotated such that the second ends 154 are oriented towards each other and the stabilizers 144 are able to form a friction fit with the smaller frame 108. In an alternative embodiment, the stabilizers 144 may not be adjustable and the first length or the second length is the length between the stabilizers 144.

During operations, the chain 104 is removed from the sprocket 118 of the front sprocket assembly 106 and the chain separator 102 is positioned on the sprocket 118 of the front sprocket assembly 106. Specifically, the chain separator 102 is positioned on the sprocket 118 of the front sprocket assembly 106 such that the sprocket 118 of the front sprocket assembly 106 is positioned within the sprocket channel 136. The stabilizers 144 are attached to the body 120 in the configuration that conforms to the size and shape of the frame 108. The body 120 is then pulled open and the stabilizers 144 are positioned proximate the frame 108. The body 120 is released and the stabilizers 144 from the friction fit on the frame 108. The chain 104 is then positioned in the chain channel 134 and the user begins the training exercise.

Figure 10:
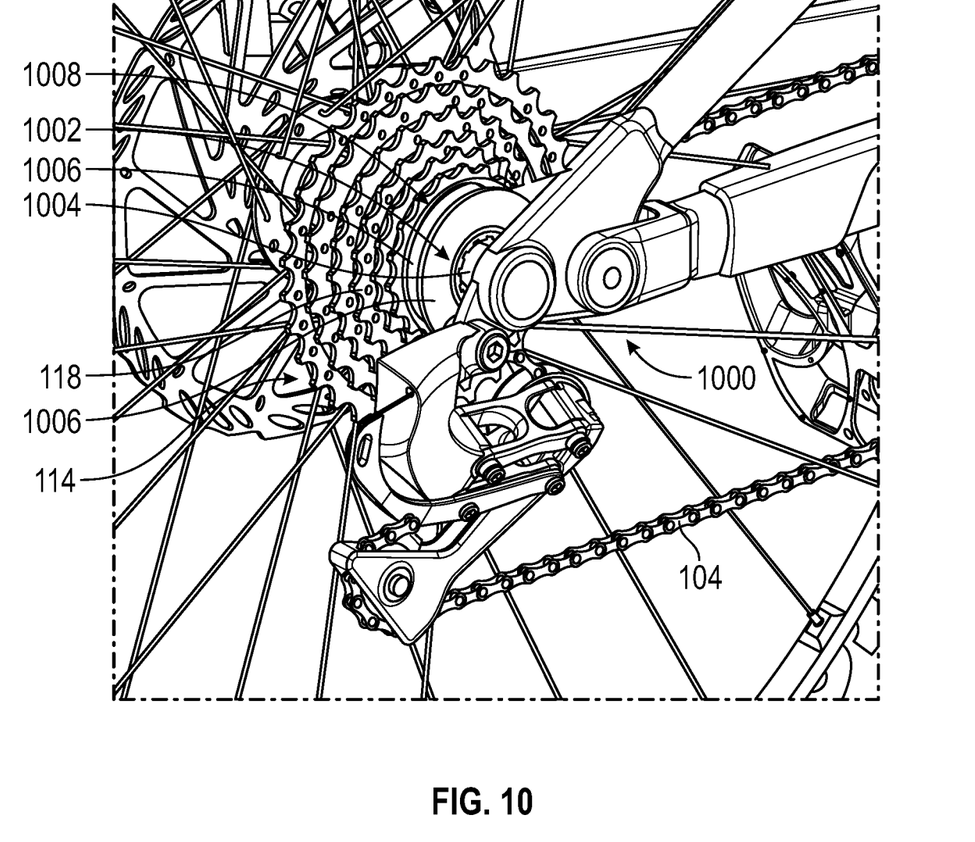
FIG. 10 is a perspective view of an alternative embodiment of a chain separator in accordance with aspects of the present disclosure.

FIG. 10 is a perspective view of an alternative embodiment of a chain separator 1000 that disengages a sprocket 118 of the rear sprocket assembly 114 from the chain 104. Specifically, the chain separator 1000 defines an axle hole 1002 that circumscribes an axle 1004 of the bicycle 100 and two sides 1006 that define a chain channel 1008. During operations, the chain 104 is removed from the sprocket 118 of the rear sprocket assembly 114 and positioned in the chain channel 1008. The user then begins the training exercise with the chain 104 disengaged from the sprocket 118 of the rear sprocket assembly 114.

Figure 11:
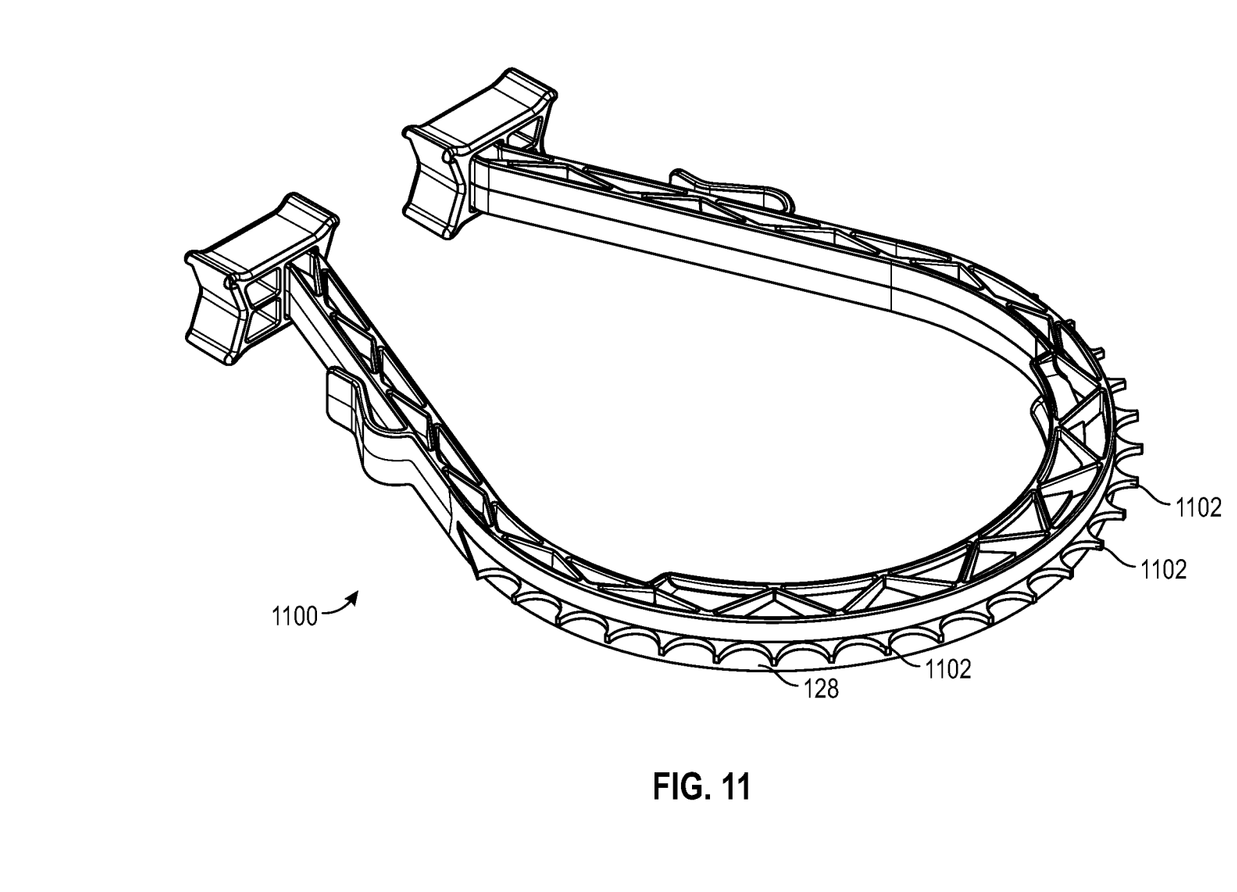
FIG. 11 is a perspective view of an alternative embodiment of a chain separator in accordance with aspects of the present disclosure.

FIG. 11 is a perspective view of an alternative embodiment of a chain separator 1100 that disengages a sprocket 118 of the front sprocket assembly 106 from the chain 104. Specifically, the chain separator 1100 include a plurality of teeth 1102 attached to the outer surface 128 and configured to maintain the chain 104 on the outer surface 128 during training. The teeth 1102 are sized and shaped to correspond to the size and shape of the teeth of the sprocket 118 of the front sprocket assembly 106 such that the teeth 1102 interface with the chain 104 in a similar manner as the sprocket 118 of the front sprocket assembly 106. More specifically, the teeth 1102 are configured to extend between individual links of the chain 104 such that the teeth 1102 maintain the chain 104 on the outer surface 128 and separated from the sprocket 118 of the front sprocket assembly 106. During operations, the chain 104 is removed from the sprocket 118 of the front sprocket assembly 106 and positioned on the teeth 1102 of the chain separator 1100. The user then begins the training exercise with the chain 104 disengaged from the sprocket 118 of the front sprocket assembly 106.

The chain separators 102 and 1000 described herein may be used in situations other than training exercises. For example, the chain separators 102 and 1000 described herein may be used by bicycle retailers to enable a potential customer to get a feel for the bicycle without actually riding it in the retail location. Additionally, the chain separators 102 and 1000 described herein may be used by bicycle maintenance personnel to enable the maintenance personnel to maintain the bicycle without the bicycle moving. Finally, the chain separators 102 and 1000 described herein may be used by mountain bikers who may wish to disable the chain, such as while riding downhill.

Figure 12:
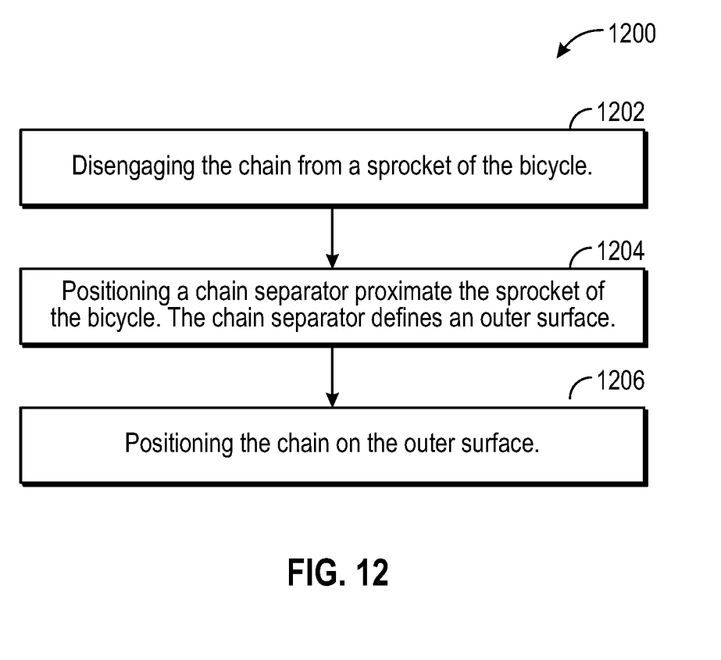
FIG. 12 is a flow diagram of a method of disabling a chain on a bicycle in accordance with aspects of the present disclosure.

FIG. 12 is a flow diagram of a method 1200 of disabling a chain on a bicycle. The method 1200 includes disengaging 1202 the chain from a sprocket of the bicycle. The method 1200 also includes positioning 1204 a chain separator proximate the sprocket of the bicycle. The chain separator defines an outer surface. The method 1200 further includes positioning 1206 the chain on the outer surface.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A chain separator for separating a chain of a bicycle from a front sprocket of the bicycle, the chain separator comprising:
   a body defining an outer surface, wherein the chain is disengaged from the front sprocket and positioned on the outer surface; and
   at least one projection extending from the body to define a sprocket channel, wherein the chain separator is positioned on the bicycle such that the front sprocket is positioned within the sprocket channel, wherein the at least one projection comprises a plurality of projections that define the sprocket channel.

2. The chain separator of claim 1, wherein the plurality of projections comprise a plurality of tapered projections that direct the front sprocket into a middle of the sprocket channel.

3. The chain separator of claim 1, wherein the plurality of projections comprises four projections.

4. The chain separator of claim 1, wherein the plurality of projections are separated from each other to define a notch.

5. The chain separator of claim 1, wherein the body has an inner surface and the plurality of projections extend from the inner surface.

6. The chain separator of claim 5, wherein the body has a first edge and a second edge and the plurality of projections are positioned proximate the first edge and the second edge.

7. The chain separator of claim 1, further comprising at least one tab extending from the body to define a chain channel with the outer surface, wherein the chain is disengaged from the front sprocket and positioned within the chain channel.

8. The chain separator of claim 7, wherein the at least one tab comprises a plurality of tabs extending from the body to define the chain channel.

9. The chain separator of claim 8, wherein the plurality of tabs comprises a plurality of rectangular tabs.

10. The chain separator of claim 8, wherein the plurality of tabs is arranged in an alternating pattern.

11. The chain separator of claim 10, wherein the plurality of projections extend from the outer surface.

12. The chain separator of claim 11, wherein the body has a first edge and a second edge and the plurality of tabs are positioned proximate the first edge and the second edge.

13. The chain separator of claim 12, wherein the plurality of tabs comprises eight tabs.

14. The chain separator of claim 13, wherein four of the eight tabs are positioned proximate the first edge.

15. The chain separator of claim 14, wherein four of the eight tabs are positioned proximate the second edge.

16. The chain separator of claim 1, further comprising at least one stabilizer attached to the body, wherein the at least one stabilizer attaches the body to a frame of the bicycle.

17. The chain separator of claim 16, wherein the at least one stabilizer is adjustably attached to the body.

18. A method of disabling a chain on a bicycle, the method comprises:
   disengaging the chain from a front sprocket of the bicycle;
   positioning a chain separator proximate the front sprocket of the bicycle, the chain separator comprises a body defining an outer surface, the chain separator further comprising a plurality of projections extending from the body to define a sprocket channel, wherein the front sprocket is positioned within the sprocket channel; and
   positioning the chain on the outer surface.

* * * * *